H. W. MUHLEISEN AND C. LUND.
ADJUSTABLE INTERNAL BRAKE SHOE.
APPLICATION FILED FEB. 24, 1919.
1,397,772.
Patented Nov. 22, 1921.
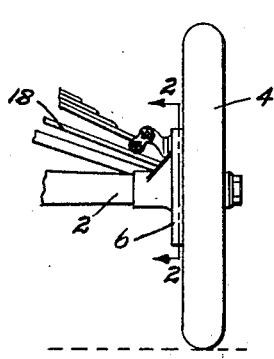
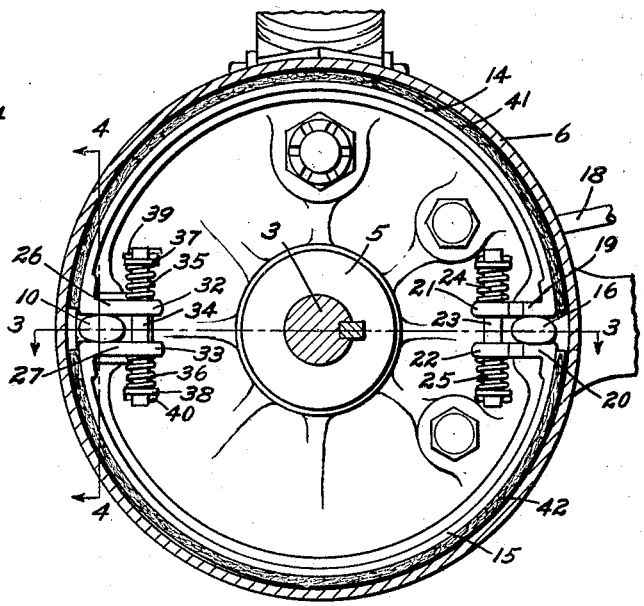
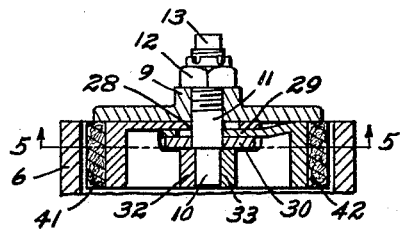
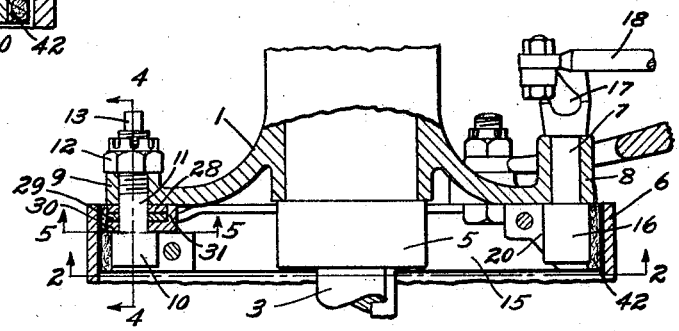
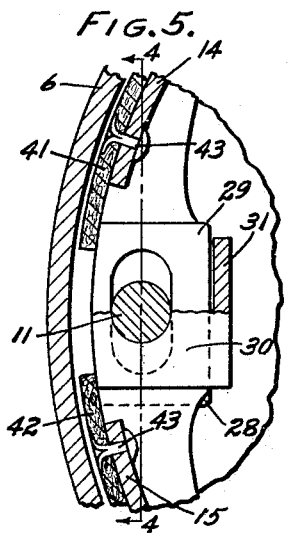
INVENTORS
HENRY W. MUHLEISEN
CLEMMEN LUND
BY Hazard & Miller
ATT'YS.

UNITED STATES PATENT OFFICE.

HENRY W. MUHLEISEN AND CLEMMEN LUND, OF LOS ANGELES, CALIFORNIA, ASSIGNORS TO W. S. RUSH & CO., OF LOS ANGELES, CALIFORNIA, A PARTNERSHIP COMPOSED OF W. S. RUSH, E. S. RUSH, AND B. C. GRAVES.

ADJUSTABLE INTERNAL BRAKE-SHOE.

1,397,772.   Specification of Letters Patent.   Patented Nov. 22, 1921.

Application filed February 24, 1919. Serial No. 278,818.

*To all whom it may concern:*

Be it known that we, HENRY W. MUHLEISEN and CLEMMEN LUND, citizens of the United States, residing at Los Angeles, in the county of Los Angeles and State of California, have invented new and useful Improvements in Adjustable Internal Brake-Shoes, of which the following is a specification.

Our object is to make an adjustable internal brake shoe, and our invention consists of the novel features herein shown, described and claimed.

Figure 1 is an edge view of the rear wheel provided with an adjustable internal brake shoe in accordance with the principles of our invention, and the axle and springs being broken away.

Fig. 2 is an enlarged cross section on the lines 2—2 of Figs. 1 and 3.

Fig. 3 is a fragmentary sectional detail on the line 3—3 of Fig. 2.

Fig. 4 is a fragmentary sectional detail on the lines 4—4 of Figs. 2, 3 and 5.

Fig. 5 is a fragmentary sectional detail on the lines 5—5 of Figs. 3 and 4.

The brake shoe support 1 is rigid with the rear axle housing 2 and is circular in end elevation. The rear axle 3 extends through the axle housing 2 and through the brake support 1, and the wheel 4 is mounted upon the axle 3 with the hub 5 against the end of the housing 2, the rear axle brake drum 6 is rigid with the wheel 4, the hub brake cam shaft 7 is mounted in a bearing 8 carried by the brake support 1, the cam shaft being parallel with the axle 3, the bearing 9 is formed in the brake support 1 diametrically opposite the bearing 8, the adjusting cam 10 is formed as a head upon the adjusting bolt 11, and the adjusting bolt 11 is screw seated in the bearing 9 and has an adjusting jam nut 12 upon its inner end and an operating wrench seat head 13 at the inner side of the nut. The adjusting brake shoes 14 and 15 together make nearly a circle and normally fit loosely within the brake drum 6. The operating cam 16 is formed as a head upon the cam shaft 7, the crank arm 17 is connected to the cam shaft 7 against the inner end of the bearing 8, and the operating rod 18 is connected to the crank arm. Heads 19 and 20 are formed upon adjacent ends of the brake shoes 14 and 15, said heads having flat radial faces engaging the operating cam 16. The operating cam 16 is oval in end elevation and is located between the heads 19 and 20, so that when the brake rod 18 is operated one way the short diameter of the cam is between the heads, and the heads may move toward each other to loosen the brake shoes in the drum, and so that when the brake rod 18 is moved the other way the long diameter of the cam will tend to move into position crosswise of the heads 19 and 20 and separate the heads, that is move them farther apart so as to tighten the brake shoes in the drum.

Arms 21 and 22 extend from the heads 19 and 20, a rod 23 is inserted through the arms, springs 24 and 25 are placed upon the ends of the rod 23, spring seats are placed upon the rod against the springs, and pins are inserted through the rod 23 outside of the spring seats, so that the tensions of the springs 24 and 25 are exerted to pull the heads 19 and 20 against the cam 16, so that after the brake has been set and the cam is operated to release the brake, the springs 24 and 25 will pull the shoes 14 and 15 away from the brake drum.

Heads 26 and 27 are formed upon the brake shoes 14 and 15 at the opposite ends from the heads 19 and 20, and said heads 26 and 27 have radial flat faces engaging the adjusting cam 10. Overlapping ears 28 and 29 extend from the ends of the shoes 14 and 15 and have slotted openings through which the bolt 11 extends. A cap 30 is placed against the inner side of the inner ear 29 and has a central opening in which the bolt 11 fits. A flange 31 is bent from the inner edge of the cap 30 to fit the inner edges of the ears 28 and 29 and bear against the outer face of the bearing 9 so as to insure that the ears 28 and 29 are not pinched but will slide freely upon each other. The heads 26 and 27 bear upon the cap 30 and flange 31 and directly against the flange 31 in opposition to the bearing 9, so that the flange 31 supports the heads 26 and 27 and relieves the pressure upon the ears 28 and 29. Arms 32 and 33 extend from the heads 26 and 27 inwardly, a rod 34 is slidingly mounted through the arms, springs 35 and 36 are placed upon the rod 34 against the arms 32 and 33, spring seats 37 and 38 are placed upon the rod 34 against the springs 35 and 36, and pins 39 and 40 are inserted through the ends of the rod 34 outside of the spring seats 37 and 38, the tensions of the springs 35 and 36 being exerted to hold the heads 26 and 27 against the cam 10. The shaft 11 is screw seated in the bearing 9. The operating head 13 forms a wrench seat for operating the shaft 11 to adjust the cam 10, and the adjusting nut 12 jams against the bearing 9 to hold the shaft 11 rigid to hold the cam 10 in its adjusted position.

The brake shoe linings 41 and 42 are placed against the outer faces of the brake shoes 14 and 15 and secured in place by fasteners 43. The parts are so fitted that the brake drum 6 will run loosely upon the brake shoe linings 41 and 42 when the cam 16 is operated to have its low sides in engagement with the heads 19 and 20, as in Fig. 2, and so that when the cam is operated to bring the sides into engagement with the heads 19 and 20 the linings 41 and 42 fit tightly within the brake drum 6, and the brake is set. When the linings 41 and 42 wear away the cam 10 is adjusted to move the heads 26 and 27 apart and fixed to hold the heads in their adjusted positions, and this operation may be continued from time to time as the linings wear away and until it is desired to renew the linings.

Various changes may be made without departing from the spirit of our invention as claimed.

We claim:

A brake support; a brake drum adjacent the brake support; two brake shoes fitting within the brake drum and adapted to tighten upon the drum by expansion; an operating cam between adjacent ends of the shoes for setting the brake; heads upon the opposite ends of the brake shoes; an elongated cam between the heads; a shaft extending from the cam and screw seated through the brake support; a jam nut upon the shaft; and an operating head extending from the shaft beyond the jam nut, so that the operating head may be engaged by a tool to rotate the shaft to adjust the cam to expand the shoe, and then the jam nut tightened to hold the cam in its adjusted position.

In testimony whereof we have signed our names to this specification.

HENRY W. MUHLEISEN.
CLEMMEN LUND.